US009722271B2

(12) United States Patent
Kim et al.

(10) Patent No.: US 9,722,271 B2
(45) Date of Patent: Aug. 1, 2017

(54) POLYMER ELECTROLYTE MEMBRANE, MEMBRANE ELECTRODE ASSEMBLY AND FUEL CELL INCLUDING THE SAME

(71) Applicant: Samsung SDI Co., Ltd., Yongin-si, Gyeonggi-do (KR)

(72) Inventors: Jun-Young Kim, Yongin-si (KR); Yeon-Su Kim, Yongin-si (KR); Tae-Yoon Kim, Yongin-si (KR); Hee-Tak Kim, Yongin-si (KR); Jin-Hwa Lee, Yongin-si (KR); Bok-Chun Yun, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 10 days.

(21) Appl. No.: 14/320,458

(22) Filed: Jun. 30, 2014

(65) Prior Publication Data

US 2015/0236367 A1    Aug. 20, 2015

(30) Foreign Application Priority Data

Feb. 17, 2014    (KR) .................. 10-2014-0018037

(51) Int. Cl.
*H01M 8/10*        (2016.01)
*H01M 8/1053*      (2016.01)
(Continued)

(52) U.S. Cl.
CPC ....... *H01M 8/1053* (2013.01); *H01M 8/1004* (2013.01); *H01M 8/1039* (2013.01);
(Continued)

(58) Field of Classification Search
CPC ............. H01M 8/1053; H01M 8/1039; H01M 8/1046; H01M 8/1004; H01M 2008/1095;
(Continued)

(56) References Cited

U.S. PATENT DOCUMENTS

2004/0197626 A1    10/2004  Jeon et al.
2005/0181285 A1*    8/2005  Sakamoto .............. H01B 1/122
                                                   429/304
(Continued)

FOREIGN PATENT DOCUMENTS

KR    10-2004-0092024 A    11/2004
KR    10-2007-0087790 A     8/2007
(Continued)

OTHER PUBLICATIONS

EPO Search Report dated Jul. 16, 2015, for corresponding European Patent application 14178128.6, (6 pages).
EPO Office Action dated Apr. 3, 2017, for corresponding European Patent Application No. 14178128.6 (5 pages).

*Primary Examiner* — Jane Rhee
(74) *Attorney, Agent, or Firm* — Lewis Roca Rothgerber Christie LLP

(57) ABSTRACT

A polymer electrolyte membrane includes a fluorinated polymer membrane and a coating layer including a hydrocarbon-based ionomer on at least one surface of the fluorinated polymer membrane. The polymer electrolyte membrane maintains high hydrogen ion conductivity and has improved performance under high temperature and low humidity conditions. A membrane electrode assembly and a fuel cell including the polymer electrolyte membrane are also disclosed.

15 Claims, 4 Drawing Sheets

(51) Int. Cl.
*H01M 8/1039* (2016.01)
*H01M 8/1046* (2016.01)
*H01M 8/1004* (2016.01)
*H01M 8/1018* (2016.01)

(52) U.S. Cl.
CPC .. *H01M 8/1046* (2013.01); *H01M 2008/1095* (2013.01); *H01M 2250/20* (2013.01); *H01M 2300/0082* (2013.01); *H01M 2300/0094* (2013.01)

(58) Field of Classification Search
CPC ..... H01M 2250/20; H01M 2300/0094; H01M 2300/0082
See application file for complete search history.

(56) References Cited

U.S. PATENT DOCUMENTS

| | | | |
|---|---|---|---|
| 2006/0292415 A1* | 12/2006 | Song | C08J 5/2275 429/483 |
| 2007/0128425 A1 | 6/2007 | Hadj Romdhane et al. | |
| 2013/0101918 A1* | 4/2013 | Yandrasits | H01M 8/1023 429/482 |

FOREIGN PATENT DOCUMENTS

| | | |
|---|---|---|
| KR | 10-2011-0114790 A | 10/2011 |
| WO | WO 2013/061054 A1 | 5/2013 |

* cited by examiner

POLYMER ELECTROLYTE MEMBRANE, MEMBRANE ELECTRODE ASSEMBLY AND FUEL CELL INCLUDING THE SAME

CROSS-REFERENCE TO RELATED APPLICATION

This application claims priority to and the benefit of Korean Patent Application No. 10-2014-0018037, filed on Feb. 17, 2014 in the Korean Intellectual Property Office, the disclosure of which is incorporated herein in its entirety by reference.

BACKGROUND

1. Field

One or more embodiments of the present invention relate to a polymer electrolyte membrane, a membrane electrode assembly, and a fuel cell including the polymer electrolyte membrane.

2. Description of the Related Art

Typical examples of a fuel cell are a polymer electrolyte membrane fuel cell (PEMFC), a direct methanol fuel cell (DMFC), a phosphoric acid fuel cell (PAFC), a molten carbonate fuel cell (MCFC), or a solid oxide fuel cell (SOFC).

The PEMFC is recognized as a system that has high efficiency, high power density, low driving temperature, and environmentally friendly properties, and can potentially replace conventional energy conversion devices.

The PEMFC generally includes a membrane electrode assembly (MEA) including an anode, a cathode, and a polymer electrolyte membrane between the anode and the cathode.

As a polymer electrolyte membrane used in a PEMFC, a fluorinated polymer electrolyte membrane and a hydrocarbon-based polymer electrolyte membrane are generally used. The fluorinated polymer electrolyte membrane has good ion conductivity, chemical stability, and ion selectivity. However, the fluorinated polymer electrolyte membrane is expensive, has high hydrogen gas permeability, and has a reduced efficiency at a temperature at or above 80° C.

SUMMARY

One or more embodiments of the present invention are directed to a polymer electrolyte membrane that provides for a reduced crossover of hydrogen gas, without a substantial decrease in hydrogen ion conductivity, and has improved performance under high temperature and low humidity conditions.

One or more embodiments of the present invention include a membrane electrode assembly including the polymer electrolyte membrane.

One or more embodiments of the present invention include a fuel cell including the polymer electrolyte membrane.

Additional aspects will be set forth in part in the description which follows and, in part, will be apparent from the description, or may be learned by practice of the presented embodiments.

According to one or more embodiments of the present invention, a polymer electrolyte membrane includes a fluorinated polymer membrane and a coating layer including a hydrocarbon-based ionomer on at least one surface of the fluorinated polymer membrane.

A thickness of the coating layer may be about 10 nm to about 50 μm.

The coating layer may include a hydrocarbon-based ionomer composition including the hydrocarbon-based ionomer.

A concentration of the hydrocarbon-based ionomer may be of about 0.1 wt % to about 50 wt % based on a total weight of the hydrocarbon-based ionomer composition.

The coating layer may include a blend of the hydrocarbon-based ionomer and a fluorinated ionomer.

A weight ratio of the hydrocarbon-based ionomer to the fluorinated ionomer may be of about 1:99 to about 99:1.

The coating layer may further include an inorganic additive.

A thickness of the fluorinated polymer membrane may be about 3 μm to about 30 μm.

The fluorinated polymer membrane may further include a radical scavenger.

According to one or more embodiments of the present invention, a membrane electrode assembly includes a cathode; an anode; and the polymer electrolyte membrane between the cathode and the anode.

The membrane electrode assembly may be adapted to be operable at a temperature of 90° C. or greater and at a relative humidity of 50% or less.

According to one or more embodiments of the present invention, a fuel cell includes a cathode; an anode; and the polymer electrolyte between the cathode and the anode.

The fuel cell may be utilized for a car.

BRIEF DESCRIPTION OF THE DRAWINGS

These and/or other aspects of embodiments of the present invention will become apparent and more readily appreciated from the following description of the embodiments, taken in conjunction with the accompanying drawings in which.

DETAILED DESCRIPTION

Figure 1:
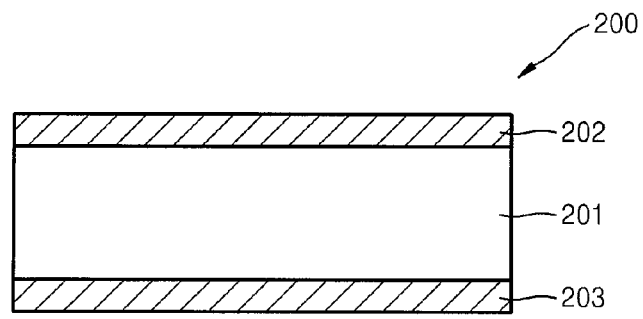
FIG. 1 is a schematic view of a polymer electrolyte membrane 200 according to an embodiment of the present invention.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the present invention refers to "one or more embodiments of the present invention."

Hereinafter, a polymer electrolyte membrane according to an embodiment of the present invention, a membrane electrode assembly and a fuel cell including the polymer electrolyte membrane will be described.

According to one embodiment, a polymer electrolyte membrane includes a fluorinated polymer membrane and a coating layer including a hydrocarbon-based ionomer on at least one surface of the fluorinated polymer membrane.

The polymer electrolyte membrane is one of the fundamental elements of the fuel cell, and can affect the performance and price of the fuel cell. The polymer electrolyte membrane needs to have high hydrogen ion conductivity, good chemical stability, low fuel permeability, high mechanical strength, low moisture content, and good dimensional stability, in order to effectively drive a polymer electrolyte membrane fuel cell (PEMFC). For example, a hydrocarbon-based polymer electrolyte membrane has low hydrogen ion conductivity under high temperature (e.g. at or above 90° C.) and low moisture conditions (e.g. at a relative humidity of 50% or less), and irregular interface properties. Therefore, the durability of the hydrocarbon-based polymer electrolyte membrane is relatively weak. A fluorinated polymer electrolyte membrane may have good hydrogen ion conductivity, chemical stability, and ion selectivity, but may require a complex manufacturing process and thus, may have a high price.

FIG. 1 is a schematic view of a polymer electrolyte membrane 200 according to one embodiment.

The polymer electrolyte membrane 200 includes a fluorinated polymer electrolyte membrane 201 and coating layers 202 and 203. At least one coating layer includes a hydrocarbon-based ionomer on the surface of a fluorinated polymer electrolyte membrane 201. As a result, the fluorinated polymer electrolyte membrane 201 prevents or reduces a decrease in hydrogen ion conductivity under high temperature and low moisture conditions, while maintaining a decreased hydrogen gas permeability, thus providing a membrane electrode assembly and a fuel cell having improved performance.

As used herein, the hydrocarbon-based ionomer is an ionomer that includes a main hydrocarbon chain, and may include a small mole fraction of non-carbon elements such as oxygen, nitrogen, sulfur and/or phosphorus.

The hydrocarbon-based ionomer may be selected from polyethersulfone, cross-linked polystyrene sulfonic acid, polyacrylic acid, polyvinyl sulfonic acid, poly (2-acrylamide-2-methylpropyl sulfonic acid), sulfonated polyimide, sulfonated polysulfone, sulfoaklylated polysulfone, sulfonated polycarbonate, a poly(p-phenylene) substituted with a sulfophenoxy benzyl group, sulfonated polyquinoxaline, sulfonated (phosphonated) polyphosphazene, sulfonated polyketone, sulfonated poly(phenylene oxide), polybenzimidazole, sulfonated polyether sulfone, sulfonated polyether ketone, sulfonated polyether ether ketone, sulfonated polyphenylene sulfide, sulfonated polyphenylene sulfone, sulfonated polyphenylene sulfide sulfone, sulfonated polyphenylene sulfide sulfone nitrile, sulfonated polysulfide ketone, sulfonated polyarylene ether, sulfonated polyarylene ether nitrile, sulfonated polyarylene ether ether nitrile, sulfonated polyarylene ether sulfone ketone, and sulfonated polyarylene ether sulfone.

A thickness of each coating layer may be, for example, about 10 nm to about 50 μM, about 100 nm to about 30 μm, or about 100 nm to about 20 μm. The coating layer having the thickness within these ranges may decrease crossover of hydrogen gas, without a substantial increase in resistance of the polymer electrolyte membrane, thus improving the performance of the membrane electrode assembly and the fuel cell including the polymer electrolyte membrane.

The hydrocarbon-based ionomer may be included in a hydrocarbon-based ionomer composition. The hydrocarbon-based ionomer composition may be obtained by adding a solvent to the hydrocarbon-based ionomer. The solvent may be any suitable solvent including, without limitation, one or more of water, N-methyl-2-pyrrolidone, N,N'-dimethyl acetamide, N,N'-dimethyl formamide, N,N'-dimethyl imidazolidinone, butyrolactone, tetrahydrofuran, cyclohexanone, and dimethyl sulfoxide.

The hydrocarbon-based ionomer may be included in an amount of about 0.1 wt % to about 50 wt % based on the total weight of the hydrocarbon-based ionomer composition. In some embodiments, the hydrocarbon-based ionomer may be included in an amount of about 0.1 wt % to about 30 wt % based on the total weight of the hydrocarbon-based ionomer composition.

Examples of a method for forming the coating layer include spray coating, bar coating, dip coating, flow coating, solution casting, screen printing, inkjet coating, doctor blading, roll coating, spin coating, and slit dye coating. In one embodiment, the method for forming the coating layer may be spray coating, bar coating, or doctor blading, but the method for forming the coating layer is not limited thereto. The coating layer may include a blend of the hydrocarbon-based ionomer and a fluorinated ionomer.

In some embodiments, the coating layer may include a blend of two or more components, the components including the hydrocarbon-based ionomer and the fluorinated ionomer.

When the coating layer includes a two-component blend including the hydrocarbon-based ionomer and the fluorinated ionomer, the hydrocarbon-based ionomer and the fluorinated ionomer may be in a weight ratio of about 1:99 to about 99:1, and in some embodiments of about 2:1 to about 10:1. When the weight ratio of the hydrocarbon-based ionomer to the fluorinated ionomer in the two-component blend of the coating layer is within the ranges described above, a crossover of hydrogen gas may be inhibited or reduced, even when the polymer electrolyte membrane is thin, such that the performance and lifespan of the membrane electrode assembly and the fuel cell including the polymer electrolyte membrane may be improved.

In some embodiments, the coating layer may include a multi-component blend of three components or more including, without limitation, a hydrocarbon-based ionomer/fluorinated ionomer/hydrocarbon-based ionomer blend, or a fluorinated ionomer/hydrocarbon-based ionomer/fluorinated ionomer blend.

The coating layer may further include an inorganic additive. In some embodiments, the inorganic additive is a hydrophilic inorganic ion additive. In embodiments where the inorganic additive is included, when the polymer electrolyte membrane operates at a temperature of about 100° C. or greater, moisture may be evaporated (or substantially evaporated) to prevent or reduce a decrease in hydrogen ion conductivity, without a substantial increase in resistance of the polymer electrolyte membrane.

An average particle diameter of the inorganic additive may be of about 10 nm to about 500 nm, or about 30 nm to about 100 nm. The inorganic additive may be in a fine powder form, and may be dispersed in a composition for forming the coating layer in order to increase mobility and/or moisture retaining characterisitics of the hydrogen ions site. The inorganic additive having the average particle diameter within the ranges described above may be uniformly dispersed in the composition for forming the coating layer and may facilitate sufficient moisture retention.

The inorganic additive may, for example, be a compound or a mixture of at least one selected from phosphotungstic acid, silicotungstic acid, zirconium hydrogen phosphate, $\alpha$-$Zr(O_{a1}PCH_{a2}OH)_a(O_{b1}PC_{b2}H_{b4}SO_{b5}H)_b \cdot nH_2O$, $\gamma$-$Zr(PO_{a1})(H_{a2}PO_{a3})_a(HO_{b1}PC_{b2}H_{b3}SO_{b4}H)_b \cdot nH_2O$, $Zr(O_{a1}PC_{a2}H_{a3})_aY_b$, $Zr(O_{a1} \ PC_{a2}H_{a3}OH)_aY_b \cdot nH_2O$, $\alpha$-$Zr(O_{a1}PC_{a2}H_{a3}SO_{b4}H)_b \cdot nH_2O$, $\alpha$-$Zr(O_{a1}POH) \cdot H_2O$, $(P_2O_5)_a(ZrO_2)_b$ glass, $P_2O_5$—$ZrO_2$—$SiO_2$ glass, silica (e.g. fumed silica, product names: Aerosil®, Cab-o-sil®, and the like), clay, alumina, mica, and zeolite (product names: SAPO-5, ZSM-5, AlPO-5, VPI-5, MCM-41, and the like). In the above formulae, a1, a2, a3, a, b1, b2, b3, b4, b5, and b may be each independently an integer of 0 to 14, and in some embodiments a1, a2, a3, a, IA, b2, b3, b4, b5, and b may be the same, and n may be an integer of 0 to 50. The clay may be pyrophyllite-talc, montmorillonite (MMT), saponite, fluorohectorite, kaolinite, vermiculite, Laponite, illite, mica, brittle mica, tetrasilicic mica, or a mixture thereof.

The coating layer may include a blend of the inorganic additive and the hydrocarbon-based ionomer, or a blend of the inorganic additive and the hydrocarbon-based ionomer together with the fluorinated ionomer, each blend at a weight ratio of about 1:99 to about 10:90. When the weight ratio of the blend is within the range described above, a uniform coating layer with no (or with reduced) phase separation may be obtained.

The fluorinated polymer membrane may include at least one selected from Nafion® (available from DuPont), Flemion™ (available from Asahi Glass), Aciplex™ (available from Asahi Kasei Chemicals Corp.), a Dow® (available from The Dow Chemical Company), and a BAM3G™ (available from Ballard Power Systems), and the fluorinated polymer membrane may additionally include a hydrophilic functional group such as a sulfonic acid group, a carbonic acid group, and/or a phosphoric acid group.

The thickness of the fluorinated polymer membrane may be of about 3 μm to about 30 μm. When the thickness of the fluorinated polymer membrane is within the range described above, hydrogen gas permeability may be decreased while a decrease in hydrogen ion conductivity of the polymer electrolyte membrane may be prevented or reduced, thereby improving the performance and lifespan of the membrane electrode assembly and the fuel cell including the polymer electrolyte membrane, without a substantial increase in resistance.

The fluorinated polymer membrane may further include a radical scavenger. The radical scavenger may stabilize the polymer electrolyte membrane by removing or capturing radicals such as peroxy radicals that traverse the polymer electrolyte membrane. The radical scavenger may be, for example, hydroxylamine, hydro-quinoline, bisphenol acrylate, aryl amine, phenol, butylated hydroxytoluene (BHT), phosphite, benzofuranone, salicylic acid, azulenyl nitrone and derivatives thereof, tocopherol, 5,5-Dimethyl-1-Pyrroline-N-Oxide (DMPO), cyclic and acyclic nitrone, gold-chitosan nanocomposite, ascorbic acid, $MnO_2$, $CeO_2$, or $CsO_2$. In some embodiments, the radical scavenger may include $MnO_2$, $CeO_2$, or $CsO_2$, but the radical scavenger is not limited thereto.

According to another aspect of the present embodiments, a membrane electrode assembly includes a cathode, an anode, and a polymer electrolyte membrane between the cathode and the anode.

Figure 2:
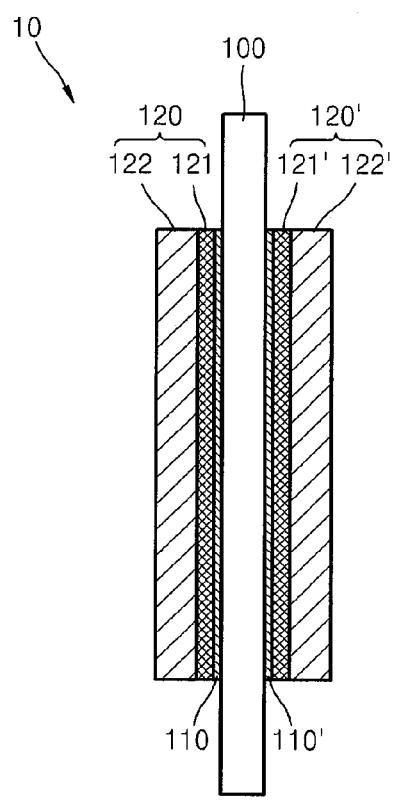
FIG. 2 is a schematic cross-sectional view of a membrane electrode assembly (MEA) 10 according to an embodiment of the present invention.

FIG. 2 is a schematic cross-sectional view of a membrane electrode assembly (MEA) 10 according to one embodiment of the present invention.

The membrane electrode assembly 10 includes a polymer electrolyte membrane 100, and a cathode and an anode, which are positioned on the opposite surfaces of the polymer electrolyte membrane 100. The cathode and the anode include gas diffusion layers 120 and 120' respectively, and the gas diffusion layers 120 and 120' respectively include microporous layers 121 and 121' on each of electrode supports 122 and 122'. In addition, catalyst layers 110 and 110' are respectively placed on the gas diffusion layers 120 and 120'. An interfacial bond layer (not shown) may be positioned between the polymer electrolyte' membrane 100 and at least one of the cathode and the anode.

The electrode supports 122 and 122' may be carbon paper or carbon fabric. However, the electrode supports 122 and 122' are not limited thereto and may be any suitable electroconductive material such as, for example, a metal or a carbonaceous material.

The gas diffusion layers 120 and 120' may be any suitable material, including commercially available products, or the gas diffusion layers 120 and 120' may each be prepared by directly coating the carbon paper with the microporous layers 121 and 121', respectively.

In order for the gas diffusion layers 120 and 120' to have suitable gas diffusion effects and electrical resistance, the thickness of the gas diffusion layers 120 and 120' may be in a range of about 200 μm to about 400 μm. In some embodiments, the thickness of the gas diffusion layers 120 and 120' may be about 100 μm to about 350 μm, or about 200 μm to about 350 μm.

In some embodiments, the gas diffusion layers 120 and 120' may be treated for water repellency. The gas diffusion layers 120 and 120' that have been treated for water repellency may prevent or reduce "flooding", a phenomenon that occurs when a large amount of the electrolyte flows from the fuel cell into the catalyst layer, thus inhibiting gas diffusion into the catalyst layer.

Materials for the water repellency treatment of the gas diffusion layers 120 and 120' include, without limitation, at least one selected from polytetrafluoroethylene (PTFE), fluorinated ethylene propylene (FEP), polyvinylidene fluoride (PVdF), Fluorosarf (from Fluoro Technology Co.), poly-hexafluoropropylene, poly-perfluoroalkyl vinyl ether, poly-perfluorosulfonyl fluoride alkoxy vinyl ether, poly-chlorotrifluoroethylene, and a copolymer thereof, or 2,2-bis trifluoromethyl-4,5-difluoro-1,3-dioxole-tetrafluoroethylene copolymer or the like.

The material for the water repellency treatment of the gas diffusion layers 120 and 120' may be in an amount of about 1 part by weight to about 30 parts by weight based on 100 parts by weight of the carbonaceous material of the gas diffusion layers 120 and 120'. When the amount of the material for the water repellency treatment of the gas diffusion layers 120 and 120' is within the range described above, flooding may be prevented or reduced and the fuel for the vehicle battery may be supplied continuously from the beginning of the drive, thus maintaining high performance of the fuel cell.

The microporous layers 121 and 121' may generally include a conductive powder having particles of a small diameter, such as, for example, carbon powder, carbon black, acetylene black, activated carbon, carbon fiber, fullerene, carbon nanotubes, carbon nanowires, carbon nanohorns, or carbon nanorings.

The catalyst layers 110 and 110' may be formed by applying a catalyst composition on the electrode supports 122 and 122' and the gas diffusion layers 120 and 120'. The catalyst composition may include a carbonaceous carrier and a metal catalyst supported on the carrier. The carbonaceous carrier may be at least one selected from carbon powder, carbon black, acetylene black, Ketjen black, activated carbon, carbon nanotubes, carbon nanofibers, carbon nanowires, carbon nanohorns, ordered nanoporous carbon, carbon aerogel, carbon cryogels, carbon nanorings, carbon nanocages, graphene, and/or mesoporous carbon. In some embodiments, the carbonaceous carrier may be prepared by heat treating the any of the carbonaceous carrier materials described above.

The metal catalyst may be at least one selected from platinum (Pt), iron (Fe), cobalt (Co), nickel (Ni), ruthenium (Ru), rhodium (Rh), palladium (Pd), osmium (Os), iridium (Ir), copper (Cu), silver (Ag), gold (Au), tin (Sn), titanium (Ti), chromium (Cr), and/or an alloy thereof. For example, the metal catalyst may be platinum (Pt) or a platinum-cobalt alloy (Pt—Co), but the metal catalyst is not limited thereto.

A binder resin may be further added to the catalyst composition. The binder resin may be, without limitation, at least one selected from a polybenzoxazine-based compound, a fluorinated compound, a benzimidazole-based compound, a polyimide-based compound, a polyether imide-based compound, a polyphenylene sulfide-based compound, a polysulfone-based compound, a polyether sulfone-based compound, a polyether ketone-based compound, a polyetherether ketone-based compound, and/or a polyphenyl quinoxaline-based compound.

In one embodiment, the polymer electrolyte membrane 100 may include a fluorinated polymer membrane and a coating layer including a hydrocarbon-based ionomer on at least one surface of the fluorinated polymer membrane. The fluorinated polymer electrolyte membrane may prevent or reduce the decrease in hydrogen ion conductivity under high temperature and low humidity conditions, while decreasing hydrogen gas permeability, thus improving performance. The membrane electrode assembly 10 including the polymer electrolyte membrane 100 may be operable at a temperature of 90° C. or greater and at a relative humidity of 50% or less. Composition and thickness of the coating layer included in the polymer electrolyte membrane 100, as well as the thickness of the fluorinated polymer membrane, are as described above and thus, descriptions thereof will be not be provided again. Concentration of the hydrocarbon-based ionomer may be of about 0.1 wt % to about 50 wt % and in some embodiments, of about 0.1 wt % to about 30 wt %.

According to another embodiment of the present invention, a fuel cell includes a cathode, an anode, and the polymer electrolyte membrane between the cathode and the anode.

Figure 3:
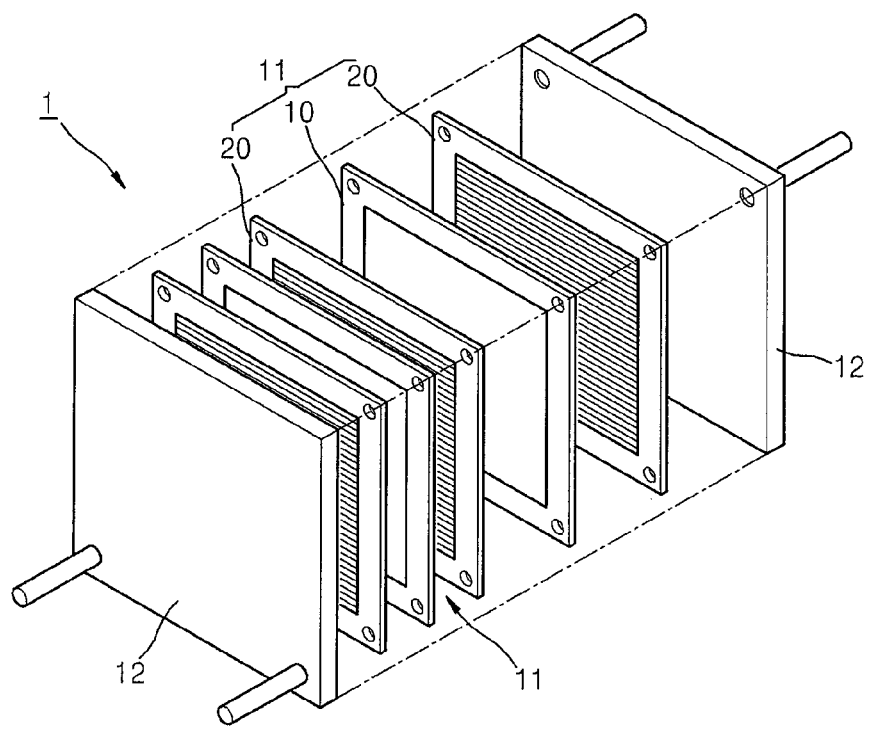
FIG. 3 is an exploded perspective view of a fuel cell 1 according to an embodiment of the present invention.

FIG. 3 is an exploded perspective view of the structure of a fuel cell 1 according to one embodiment.

As schematically shown in FIG. 3, the fuel cell 1 includes two unit cells 11 positioned between a pair of holders 12. The unit cells 11 each include a membrane electrode assembly 10 and bipolar plates 20 on each side of the membrane electrode assembly 10, the bipolar plates 20 positioned in the direction of thickness of the membrane electrode assembly 10. The bipolar plates 20 each include a metal or a carbon-based material having conductivity and are each capable of adhering to the membrane electrode assembly 10 to simultaneously act as a current collector and to supply oxygen and fuel to the catalyst layer of the membrane electrode assembly 10. The fuel cell 1 may be a fuel cell for a car, but applications for the fuel cell 1 are not limited thereto.

Hereinafter, examples of the present invention will be described. However, these examples are for illustrative purposes only and do not limit the scope of the present invention.

EXAMPLES

Example 1

Preparation of a Polymer Electrolyte Membrane

Each side of a fluorinated polymer membrane of perfluorosulfonic acid (PFSA) having a thickness of about 10 μm to about 15 μm was coated with a coating layer including a hydrocarbon-based ionomer composition to prepare a polymer electrolyte membrane. As a coating method, spray coating was used.

The hydrocarbon-based ionomer composition included a hydrocarbon-based ionomer of polyethersulfone in an N-methyl-2-pyrrolidone solution, such that the concentration of the hydrocarbon-based ionomer was 2.5 wt % based on the total weight of the hydrocarbon-based ionomer composition.

The area density of the hydrocarbon-based ionomer composition was about 0.15 mg/cm$^2$ and the thickness of the coating layer including the hydrocarbon-based ionomer composition was about 0.62 μm.

Example 2

Preparation of a Polymer Electrolyte Membrane

A polymer electrolyte membrane was prepared as in Example 1, except that the area density of the hydrocarbon-based ionomer composition was about 0.25 mg/cm$^2$, instead of about 0.15 mg/cm$^2$, and the thickness of the coating layer including the hydrocarbon-based ionomer composition was about 1.01 μm, instead of about 0.62 μm.

Example 3

Preparation of a Polymer Electrolyte Membrane

A polymer electrolyte membrane was prepared as in Example 1, except that the area density of the hydrocarbon-based ionomer composition was about 0.41 mg/cm$^2$, instead of about 0.15 mg/cm$^2$, and the thickness of the coating layer including the hydrocarbon-based ionomer composition was about 2.39 μm, instead of about 0.62 μm.

Example 4

Preparation of a Polymer Electrolyte Membrane

A polymer electrolyte membrane was prepared as in Example 1, except that the area density of the hydrocarbon-based ionomer composition was about 0.25 mg/cm$^2$ instead of about 0.15 mg/cm$^2$, and the hydrocarbon-based ionomer composition was pressed and densified on each side of the fluorinated polymer membrane of perfluorosulfonic acid (PFSA) at a temperature of 165° C. and at a pressure of 20 kgf for three minutes, such that the thickness of the resulting coating layer including the hydrocarbon-based ionomer composition was about 0.75 µm, instead of about 0.62 µm.

Example 5

Preparation of a Polymer Electrolyte Membrane

Each side of a fluorinated polymer membrane of perfluorosulfonic acid (PFSA) having a thickness of about 10 µm to about 15 µm was coated with a blend composition of a hydrocarbon-based ionomer of polyethersulfone and a fluorinated ionomer of perfluorosulfonic acid in a weight ratio of about 2:1 parts by weight (about 500 g to about 1200 g equivalent weight (EW)) to prepare a polymer electrolyte membrane. As a coating method, a spray coating was used.

The area density of the blend composition of the hydrocarbon-based ionomer and the fluorinated ionomer was about 0.11 mg/cm² and the thickness of the blend coating layer including the hydrocarbon-based ionomer and the fluorinated ionomer composition was about 0.34 µm.

Example 6

Preparation of a Polymer Electrolyte Membrane

A polymer electrolyte membrane was prepared as in Example 5, except that the area density of the blend composition of the hydrocarbon-based ionomer and the fluorinated ionomer was about 0.18 mg/cm², instead of about 0.11 mg/cm², and the thickness of the blend coating layer including the hydrocarbon-based ionomer and the fluorinated ionomer composition was about 0.62 µm, instead of about 0.34 µm.

Example 7

Preparation of a Polymer Electrolyte Membrane

A polymer electrolyte membrane was prepared as in Example 5, except that the area density of the blend composition of the hydrocarbon-based ionomer and the fluorinated ionomer was about 0.18 mg/cm², instead of about 0.11 mg/cm², and the blend composition of the hydrocarbon-based ionomer and the fluorinated ionomer was pressed and densified on each side of the fluorinated polymer membrane at a temperature of 165° C. and at a pressure of 20 kgf for three minutes, such that the thickness of the resulting blend coating layer including the hydrocarbon-based ionomer and the fluorinated ionomer composition was about 0.49 µm, instead of about 0.34 µm.

Comparative Example 1

Preparation of a Polymer Electrolyte Membrane

A polymer electrolyte membrane was prepared as in Example 1, except that a perfluorosulfonic acid (PFSA) fluorinated polymer membrane (Nafion®, available from DuPont) having a thickness of about 10 µm to about 15 µm was used as the polymer electrolyte membrane.

The specifics of each of the polymer electrolyte membranes prepared in Examples 1 to 7 and Comparative Example 1 are described in Table 1 below:

TABLE 1

|  | Coating layer | Coating layer composition | Area density of coating layer composition (mg/cm²) | Thickness of coating layer (µm) | Characteristics |
| --- | --- | --- | --- | --- | --- |
| Example 1 | hydrocarbon-based ionomer | polyethersulfone | about 0.15 | about 0.62 | — |
| Example 2 | hydrocarbon-based ionomer | polyethersulfone | about 0.25 | about 1.01 | — |
| Example 3 | hydrocarbon-based ionomer | polyethersulfone | about 0.41 | about 2.39 | — |
| Example 4 | hydrocarbon-based ionomer | polyethersulfone | about 0.25 | about 0.75 | Densified membrane of Example 2 |
| Example 5 | Blend of hydrocarbon-based ionomer and fluorinated ionomer | polyethersulfone and perfluorosulfonic acid (2:1 parts by weight) | about 0.11 | about 0.34 | — |
| Example 6 | Blend of hydrocarbon-based ionomer and fluorinated ionomer | polyethersulfone and perfluorosulfonic acid (2:1 parts by weight) | about 0.18 | about 0.62 | — |
| Example 7 | Blend of hydrocarbon-based ionomer and fluorinated ionomer | polyethersulfone and perfluorosulfonic acid (2:1 parts by weight) | about 0.18 | about 0.49 | Densified membrane of Example 6 |
| Comparative Example 1 | — | — | — | — | — |

Example 8

Preparation of Membrane Electrode Assembly

An anode and a cathode were formed by respectively applying an anode catalyst layer and a cathode catalyst layer to the polymer electrolyte membrane of Example 1 having a size of 7 cm×7 cm and a sheet of carbon paper having a size of 5 cm×5 cm. The anode catalyst layer and the cathode catalyst layer were prepared by mixing 5 wt % Nafion®/$H_2O$/2-propanol solution, dipropylene glycol, and deionized water with a Pt catalyst and Pt—Co catalyst, respectively, to prepare a catalyst slurry, coating the catalyst slurry on a Teflon® membrane by using a doctor blading method, and then drying. The area densities of the catalyst in the cathode catalyst layer and the anode catalyst layer were 0.4 mg/cm$^2$ and 0.1 mg/cm$^2$, respectively.

The anode, the polymer electrolyte membrane of Example 1, and the cathode were sequentially layered, and then pressed at a temperature of 165° C. and at a pressure of 20 kgf for three minutes to manufacture a membrane electrode assembly in which the anode catalyst layer and the cathode catalyst layer were adhered to the polymer electrolyte membrane.

Examples 9 to 14

Manufacturing a Membrane Electrode Assembly

Membrane electrode assemblies were manufactured as in Example 8, except that the polymer electrolyte membranes of Examples 2-7 were used, instead of the polymer electrolyte membrane of Example 1.

Comparative Example 2

Manufacturing a Membrane Electrode Assembly

A membrane electrode assembly was manufactured as in Example 8, except that the polymer electrolyte membrane of Comparative Example 1 was used, instead of the polymer electrolyte membrane of Example 1.

Analysis Example 1

Scanning Electron Microscope (SEM) Analysis

Figure 4A:
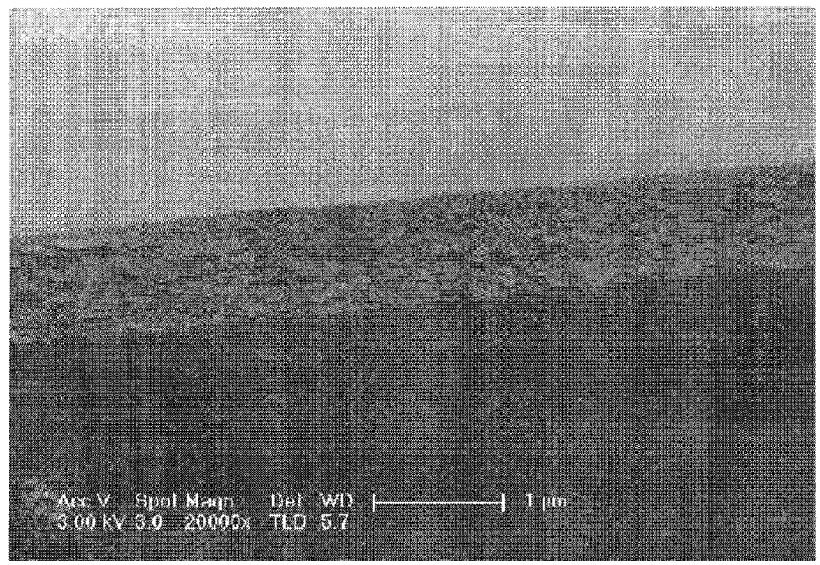
FIG. 4A is a scanning electron microscope (SEM) image of the polymer electrolyte membrane of Example 2.

The polymer electrolyte membrane prepared in Example 2 was analyzed by using a scanning electron microscope (SEM). The results are shown in FIG. 4A. Further, the membrane electrode assembly of Example 9 was subjected to an initial performance test and then analyzed using an SEM. The results are shown in FIG. 4B.

FIG. 4A illustrates that the polymer electrolyte membrane prepared in Example 2 has a coating layer including the hydrocarbon-based ionomer of polyethersulfone formed on each side of the perfluorosulfonic acid (Nafion®) fluorinated polymer membrane.

Figure 4B:
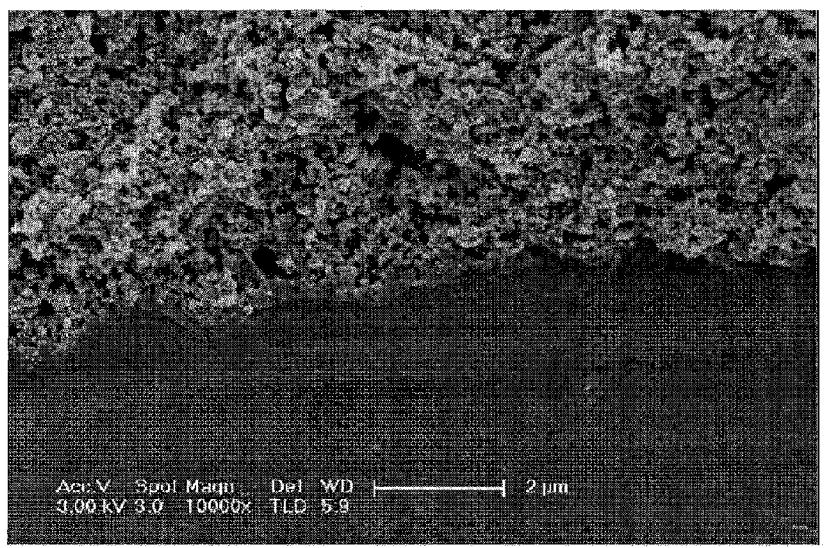
FIG. 4B is an SEM image of the membrane electrode assembly of Example 9 after an initial performance test.

FIG. 4B illustrates that even after the initial performance test, the membrane electrode assembly manufactured in Example 9 retains the coating layer including the hydrocarbon-based ionomer of polyethersulfone formed on each side of the perfluorosulfonic acid (Nafion®) fluorinated polymer membrane, without a substantial deterioration of the coating layer.

Analysis Example 2

Electrochemical Impedance Spectroscopy (EIS) and Linear Sweep Voltammetry (LSV) Analyses For each of the membrane electrode assemblies of Examples 8-14 and Comparative Example 2, a relationship between the thickness of the coating layer, $H_2$ crossover current density, and membrane resistance was analyzed using electrochemical impedance spectroscopy (EIS) and linear sweep voltammetry (LSV). The electrochemical impedance spectroscopy (EIS) was performed using SI 1287 & SI 1255B (available from Solartron Analytical), and the linear sweep voltammetry (LSV) was performed using IM6 (a product of Zahner). The obtained results are shown in Table 2 below.

During the electrochemical impedance spectroscopy (EIS) analysis, the cathode was used as a working electrode and the anode was used as a counter electrode. Also, in order to exclude over-potential due to oxidation and emission of hydrogen from the evaluation, the anode was used as a reference electrode. While measuring impedance, fully humidified hydrogen and oxygen were supplied.

To measure current at the working electrode by using linear sweep voltammetry (LSV), a potential of 0.2 V was used, and fully humidified hydrogen and oxygen were supplied during the analysis process.

TABLE 2

|  | Thickness of coating layer (um) | Membrane resistance (mOhm/cm$^2$) | $H_2$ crossover current density @ 0.2 V (mA/cm$^2$) |
| --- | --- | --- | --- |
| Example 8 | 0.62 | 53.6 | 1.95 |
| Example 9 | 1.01 | 60.2 | 1.72 |
| Example 10 | 2.39 | 63.5 | 1.25 |
| Example 11 | 0.75 | 58.1 | 1.47 |
| Example 12 | 0.35 | 50.6 | 2.25 |
| Example 13 | 0.62 | 52.5 | 1.92 |
| Example 14 | 0.49 | 52.4 | 1.82 |
| Comparative Example 2 | — | 50.3 | 2.75 |

As illustrated in Table 2, the membrane electrode assemblies of Examples 8 to 14 and Comparative Example 2 showed a decrease in $H_2$ crossover current density at 0.2 V without a substantial increase in the membrane resistance, even though the membrane electrode assemblies of Examples 8 to 14 had increased thickness compared to the thickness of the membrane electrode assembly of Comparative Example 2.

Analysis Example 3

Performance Analysis of a Membrane Electrode Assembly

Performance (i.e. current density and cell voltage) of the membrane electrode assemblies of Examples 8 to 14 and Comparative Example 2 were analyzed at 0 kPa, at a relative humidity of 50%-50% (cathode-anode), and at a temperature of 65° C. The obtained results are shown in Table 3.

TABLE 3

|  | Current density @ 0.6 V, 65° C., 50% RH (mA/cm²) | Cell voltage @ 1.5 mA/cm², 65° C., 50% RH (V) |
|---|---|---|
| Example 8 | 1.27 | 0.560 |
| Example 9 | 1.22 | 0.550 |
| Example 10 | 1.05 | 0.503 |
| Example 11 | 1.20 | 0.548 |
| Example 12 | 1.45 | 0.594 |
| Example 13 | 1.35 | 0.576 |
| Example 14 | 1.37 | 0.580 |
| Comparative Example 2 | 1.30 | 0.571 |

Referring to Table 3, current densities and cell voltages of the membrane electrode assemblies of Examples 12 to 14 were better than the current density and cell voltage of the membrane electrode assembly of Comparative Example 2, when evaluated under high temperature and low moisture conditions. In addition, the current density and cell voltage of the membrane electrode assembly of Example 14 was better than the current density and cell voltage of the membrane electrode assembly of Example 13. Without being bound by any particular theory, it is believed that this result is because the polymer electrolyte membrane included in the membrane electrode assembly of Example 14 was a densified polymer electrolyte membrane of Example 6, while the polymer electrolyte membrane included in the membrane electrode assembly of Example 13 was not densified.

In addition, current density and cell voltage of the membrane electrode assemblies of Examples 8, 12, and 14 were measured at 70 kPa, at a relative humidity of 50%-50% (cathode-anode), and at a temperature of 90° C. The obtained results are shown in FIG. 5.

Figure 5:
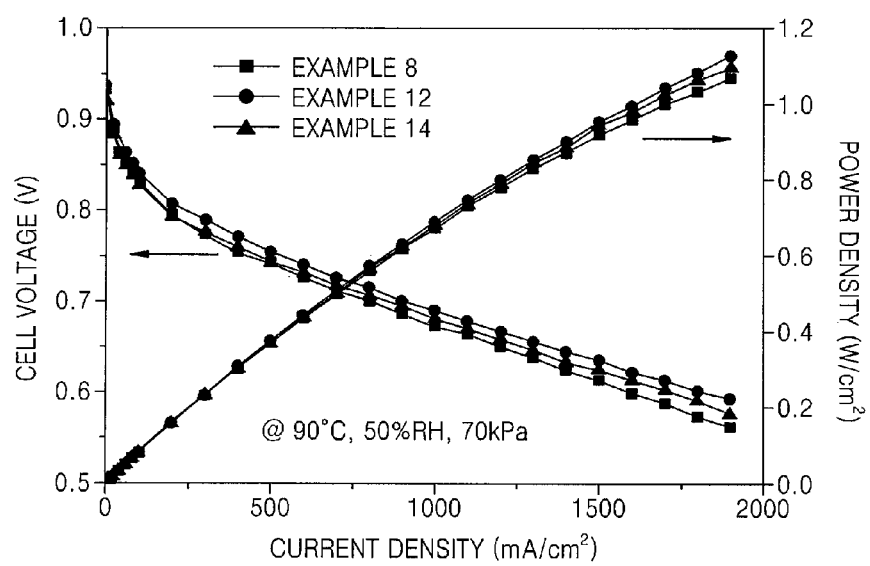
FIG. 5 is a graph comparing current density, power density, and cell voltage of the membrane electrode assemblies of Examples 8, 12, and 14 at 70 kPa, at relative humidity of 50%-50% (cathode-anode), and at a temperature of 90° C.

Referring to FIG. 5, the membrane electrode assemblies of Examples 8, 12, and 14 showed high current density and cell voltage, and thus showed improved performance at a temperature of 90° C., 50% RH, and 70 kPa. In addition, among the membrane electrode assemblies of Examples 8, 12, and 14, the membrane electrode assembly of Example 12, which had the thinnest coating layer, had the highest current density and cell voltage. Therefore, the performance of the membrane electrode assembly of Example 12 was the highest, followed by the membrane electrode assembly of Example 14 and then the membrane electrode assembly of Example 8.

According to one or more of the above embodiments of the present invention, a polymer electrolyte membrane including a fluorinated polymer membrane and a coating layer that includes a hydrocarbon-based ionomer on at least one surface of the fluorinated polymer membrane, may reduce crossover of hydrogen gas without a substantial decrease in hydrogen ion conductivity and therefore, may improve performance of a membrane electrode assembly and a fuel cell including the polymer electrolyte membrane under high temperature and low moisture conditions.

It should be understood that the exemplary embodiments described therein should be considered in a descriptive sense only and not for purposes of limitation. Descriptions of features or aspects within each embodiment are not limited to the disclosed embodiments, but, on the contrary, are intended to cover various modifications and equivalent arrangements included within the spirit and scope of the appended claims and equivalents thereof.

What is claimed is:

1. A polymer electrolyte membrane comprising a fluorinated polymer membrane and a coating layer comprising a blend of a hydrocarbon-based ionomer and a fluorinated ionomer on at least one surface of the fluorinated polymer membrane, the coating layer having a thickness of about 10 nm to about 2.39 µm,
   wherein a weight ratio of the hydrocarbon-based ionomer to the fluorinated ionomer is about 2:1 to about 10:1, and
   wherein the hydrocarbon-based ionomer comprises at least one ionomer selected from the group consisting of polyethersulfone, cross-linked polystyrene sulfonic acid, polyacrylic acid, polyvinyl sulfonic acid, poly (2-acrylamide-2-methylpropyl sulfonic acid), sulfonated polyimide, sulfonated polysulfone, sulfoaklylated polysulfone, sulfonated polycarbonate, a poly(p-phenylene) substituted with a sulfophenoxy benzyl group, sulfonated polyquinoxaline, sulfonated (phosphonated) polyphosphazene, sulfonated polyketone, sulfonated poly(phenylene oxide), sulfonated polyethersulfone, sulfonated polyether ketone, sulfonated polyether ether ketone, sulfonated polyphenylene sulfide, sulfonated polyphenylene sulfone, sulfonated polyphenylene sulfide sulfone, sulfonated polyphenylene sulfide sulfone nitrile, sulfonated polysulfide ketone, sulfonated polyarylene ether, sulfonated polyarylene ether nitrile, sulfonated polyarylene ether ether nitrile, sulfonated polyarylene ether sulfone ketone, sulfonated polyarylene ether sulfone, and combinations thereof.

2. The polymer electrolyte membrane of claim 1, wherein the coating layer is formed by applying a blend composition comprising the hydrocarbon-based ionomer and the fluorinated ionomer.

3. The polymer electrolyte membrane of claim 2, wherein a concentration of the hydrocarbon-based ionomer is of about 0.1 wt % to about 50 wt % based on a total weight of a hydrocarbon-based ionomer composition.

4. The polymer electrolyte membrane of claim 1, wherein the coating layer further comprises an inorganic additive.

5. The polymer electrolyte membrane of claim 4, wherein an average particle diameter of the inorganic additive is of about 10 nm to about 500 nm.

6. The polymer electrolyte membrane of claim 4, wherein the inorganic additive is at least one selected from the group consisting phosphotungstic acid, silicotungstic acid, zirconium hydrogen phosphate, $\alpha\text{-}Zr(O_{a1}PCH_{a2}OH)_a(O_{b1}PC_{b2}H_{b4}SO_{b5}H)_b \cdot nH_2O$, wherein a1, a2, a, b1, b2, b4, b5, and b are each independently an integer of 0 to 14, and n is an integer of 0 to 50, $\text{v-}Zr(PO_{a1})(H_{a2}PO_{a3})_a(HO_{b1}PC_{b2}H_{b3}SO_{b4}H)_b \cdot nH_2O$, wherein a1, a2, a3, a, b1, b2, b3, b4, and b are each independently an integer of 0 to 14, and n is an integer of 0 to 50, $Zr(O_{a1}PC_{a2}H_{a3})_a Y_b$, wherein a1, a2, a3, a, and b are each independently an integer of 0 to 14, $Zr(O_{a1}PCH_{a2}OH)_a Y_b \cdot nH_2O$, wherein a1, a2, a, and b are each independently an integer of 0 to 14, and n is an integer of 0 to 50, $\alpha\text{-}Zr(O_{a1}PC_{a2}H_{a3}SO_{a4}H)_a \cdot nH_2O$, wherein a1, a2, a3, a4, and a are each independently an integer of 0 to 14, and n is an integer of 0 to 50, $\alpha\text{-}Zr(O_{a1}POH) \cdot H_2O$, wherein a1 is an integer of 0 to 14, $(P_2O_5)_a(ZrO_2)_b$ glass, wherein a and b are each independently an integer of 0 to 14, $P_2O_5\text{—}ZrO_2\text{—}SiO_2$ glass, silica, clay, alumina, mica, SAPO-5, ZSM-5, AlPO-5, VPI-5, and MCM-41.

7. The polymer electrolyte membrane of claim 1, wherein a thickness of the fluorinated polymer membrane is about 3 µm to about 30 µm.

8. The polymer electrolyte membrane of claim 1, wherein the fluorinated polymer membrane further comprises a radical scavenger.

9. The polymer electrolyte membrane of claim 8, wherein the radical scavenger comprises $MnO_2$, $CeO_2$, or $CsO_2$.

10. A membrane electrode assembly comprising:
a cathode;
an anode; and
the polymer electrolyte membrane of claim 1 between the cathode and the anode.

11. The membrane electrode assembly of claim 10, wherein an interfacial bond layer is between the polymer electrolyte membrane and at least one of the cathode and the anode.

12. The membrane electrode assembly of claim 10, wherein the membrane electrode assembly is adapted to be operable at a temperature of 90° C. or greater and at a relative humidity of 50% or less.

13. The membrane electrode assembly of claim 10, wherein at least one of the cathode and the anode further comprises a catalyst layer.

14. A fuel cell comprising:
a cathode;
an anode; and
the polymer electrolyte membrane of claim 1 between the cathode and the anode.

15. The fuel cell of claim 14, wherein the fuel cell can be utilized in a car.

* * * * *